(12) United States Patent
Cheng et al.

(10) Patent No.: US 12,304,613 B2
(45) Date of Patent: May 20, 2025

(54) ONE PIECE MULTIFUNCTIONAL NANOLAMINATED COMPOSITE WINDOW PANEL

(71) Applicant: The Boeing Company, Chicago, IL (US)

(72) Inventors: Jiangtian Cheng, Mukilteo, WA (US); Paul S. Nordman, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 470 days.

(21) Appl. No.: 17/820,521

(22) Filed: Aug. 17, 2022

(65) Prior Publication Data

US 2022/0388625 A1 Dec. 8, 2022

Related U.S. Application Data

(62) Division of application No. 16/402,034, filed on May 2, 2019, now Pat. No. 11,453,474.

(51) Int. Cl.
| | | |
|---|---|---|
| *B64C 1/14* | (2006.01) | |
| *B32B 3/26* | (2006.01) | |
| *B64F 5/10* | (2017.01) | |

(52) U.S. Cl.
CPC ............ *B64C 1/1492* (2013.01); *B32B 3/263* (2013.01); *B64F 5/10* (2017.01); *B32B 2255/20* (2013.01); *B32B 2255/26* (2013.01); *B32B 2307/212* (2013.01); *B32B 2605/18* (2013.01)

(58) Field of Classification Search
CPC . B32B 3/263; B32B 2255/20; B32B 2255/26; B32B 2307/212; B32B 2605/18; B64C 1/1492; B64F 5/10
See application file for complete search history.

(56) References Cited

U.S. PATENT DOCUMENTS

| | | |
|---|---|---|
| 4,232,080 A | 11/1980 | Orain et al. |
| 6,921,859 B2 | 7/2005 | Hikita et al. |
| 8,917,962 B1 | 12/2014 | Nichol et al. |

(Continued)

FOREIGN PATENT DOCUMENTS

| | | |
|---|---|---|
| EP | 0459704 A1 | 12/1991 |
| EP | 2879951 B1 | 4/2019 |
| GB | 896060 A | 5/1962 |

OTHER PUBLICATIONS

Office Action issued Jun. 5, 2023 in corresponding Canadian Application No. 3,079,589, 4 pages.

(Continued)

*Primary Examiner* — Maria V Ewald
*Assistant Examiner* — Ethan Weydemeyer
(74) *Attorney, Agent, or Firm* — MH2 Technology Law Group LLP

(57) ABSTRACT

A method for producing a window assembly includes producing a structural panel. Producing the structural panel includes depositing one or more structural reinforcement layers. Each of the one or more structural reinforcement layers includes a plurality of nanolaminated layers. The nanolaminated layers include $Al_2O_3$, $SiO_2$, graphene, or a combination thereof. Producing the structural panel also includes depositing a structural transparent polymer layer on the one or more structural reinforcement layers. The structural transparent polymer layer includes a transparent thermoplastic material.

19 Claims, 5 Drawing Sheets

(56) References Cited

U.S. PATENT DOCUMENTS

| | | |
|---|---|---|
| 2012/0133315 A1 | 5/2012 | Berman et al. |
| 2013/0095311 A1 | 4/2013 | Rukavina et al. |
| 2015/0219810 A1 | 8/2015 | Taka |
| 2015/0237929 A1 | 8/2015 | Greenhill et al. |

OTHER PUBLICATIONS

Communication pursuant to Article 94(3) EPC issued Aug. 4, 2023 in related European Application No. 20172622.1, 7 pages.
Extended European Search Report issued Oct. 2, 2020 in corresponding European Application No. 20172622.1, 6 pages.

ONE PIECE MULTIFUNCTIONAL NANOLAMINATED COMPOSITE WINDOW PANEL

CROSS-REFERENCE TO RELATED APPLICATIONS

This application is a divisional of U.S. patent application Ser. No. 16/402,034, filed on May 2, 2019, the entirety of which is incorporated by reference herein.

FIELD

The present disclosure generally relates to window assemblies and, more particularly, to methods and systems for frameless, structural window assemblies.

BACKGROUND

Window assemblies for vehicles or structures typically include windows made of glass, plastic, or composite materials mounted in a frame. The frame supports the window and reinforces the cutout in the vehicle or structure in which the window is installed. For example, an aircraft window assembly generally includes a window formed of two panes of acrylic mounted in a metal frame. The window fits into a cutout in the aircraft skin and the metal frame mechanically attaches to the aircraft skin forming the fuselage. The frame insures that the structural load is born by the frame instead of the acrylic windows. FIG. 1 depicts an aircraft 100 including an enlarged cross-sectional view of a window assembly 110. Window assembly 110 consists of an inner window 120 and an outer window 125 both formed of acrylic. Inner window 120 and outer window 125 and are attached to and supported by a frame 130. Frame 130 is attached to an aircraft skin 190 of aircraft 100 by a plurality of fasteners 185.

Window assemblies that include a frame, however, have several limitations. The cutouts can increase the local stress, for example, in the aircraft skin. And, a material property mismatch between the acrylic windows and the metal frame can generate local stress at the cutout. While the frame provides structural support to the window assembly, it also adds weight and limits window size.

Particularly for aircraft applications, acrylic windows are not ideal because acrylic has low thermal conductivity and low strength. As a result, window sizes are generally small affecting passenger experience. And, because acrylic windows are not electrically conductive, additional electromagnetic effect (EME) solutions need to be added to the window and frame.

SUMMARY

A method for producing a window assembly is disclosed. The method includes producing a structural panel. Producing the structural panel includes depositing one or more structural reinforcement layers. Each of the one or more structural reinforcement layers includes a plurality of nanolaminated layers. The nanolaminated layers include $Al_2O_3$, $SiO_2$, graphene, or a combination thereof. Producing the structural panel also includes depositing a structural transparent polymer layer on the one or more structural reinforcement layers. The structural transparent polymer layer includes a transparent thermoplastic material.

In another implementation, the method includes producing a protection panel including a protection panel edge. The method also includes coupling a structural panel to the protection panel. The structural panel includes a plurality of nanolaminated layers. Each of the plurality of nanolaminated layers has a thickness in a range from 20 nm to 1,000 nm. The structural panel has a tensile stress of about 30 ksi to about 2,000 ksi to bear a structural load when mounted directly to a vehicle without a window frame. The window assembly has a transmissivity of about 45% to about 99% to visible light.

A method for assembling a vehicle is also disclosed. The method includes mounting a window assembly to the vehicle. The window assembly includes a protection panel and a structural panel. The protection panel includes a surface barrier transparent polymer layer including a transparent thermoplastic material. The protection panel also includes a surface barrier reinforcement layer formed of a plurality of nanolaminated layers disposed on the surface barrier transparent polymer layer. The nanolaminated layers includes one of carbon nanotubes, indium tin oxide with graphene, or combinations thereof. The structural panel is disposed on the protection panel. The structural panel includes a structural transparent polymer layer including a transparent thermoplastic material. The structural panel also includes one or more structural reinforcement layers disposed on the structural transparent polymer layer. Each of the one or more structural reinforcement layers includes a plurality of nanolaminated layers. The nanolaminated layers include $Al_2O_3$, $SiO_2$, graphene, or combinations thereof.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate the present disclosure and together with the description, serve to explain the principles of the present disclosure.

DESCRIPTION

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure may be practiced. These implementations are described in sufficient detail to enable those skilled in the art to practice the present disclosure and it is to be understood that other implementations may be utilized and that changes may be made without departing from the scope of the present disclosure. The following description is, therefore, merely exemplary.

Currently, window assemblies include a transparent window mounted in a frame. While the frame provides structural support for the window assembly, it also adds weight and limits the size of the window. Glass, plastics or composite window materials are generally low strength and may also require additional coatings to prevent ice build-up and protect against EME. Implementations of the present disclosure address the need for a one piece structural window that can be directly attached, for example to a vehicle, equipment, or structure, without a frame.

The disclosed nanolaminated window assembly is self-supporting, therefore eliminating the need for a frame for support. For particular applications, such as in an aircraft, the self-supporting nature of the nanolaminated window allows direct attachment to the aircraft skin to provide structural support and load bearing capability. Because no frame is needed, the disclosed nanolaminated window can also provide a larger window area with reduced weight. And, the one piece multifunctional design can provide one or more of impact protection, ice buildup prevention, and EME protection.

As used herein, the term "nano-laminate" and "nanolaminated" refer to a composite material formed by alternating layers of materials having a thickness in a range of about 20 nm to about 1,000 nm. Use of nanolaminated layers in the disclosed window assemblies provides the ability to tailor specific properties of the window assembly including one or more of thickness, composition, isotropic stiffness, and strength.

Figure 1:
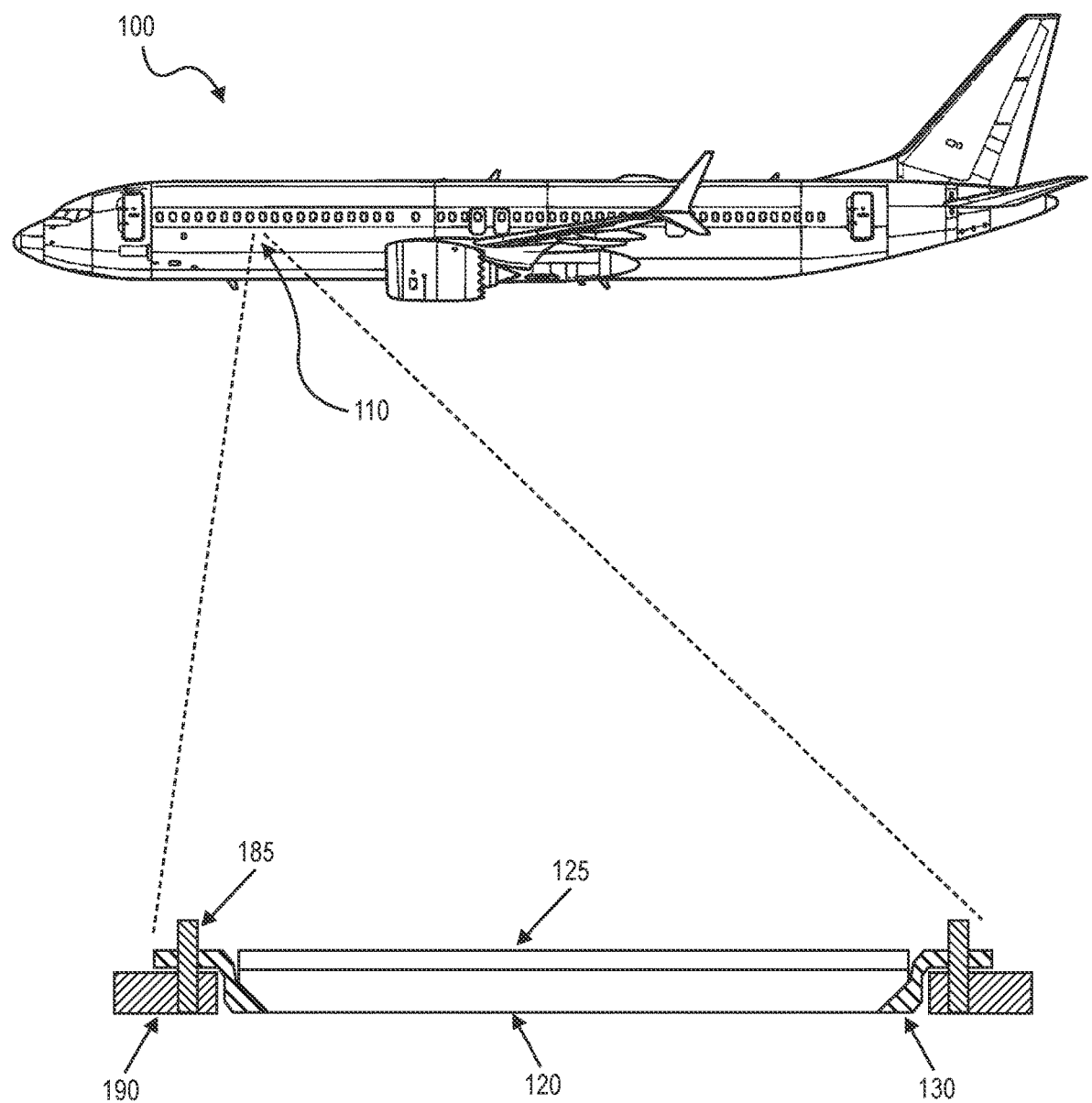
FIG. 1 schematically depicts a conventional window assembly mounted in an aircraft and an enlarged cross-sectional view of the conventional window assembly.
Figure 2:
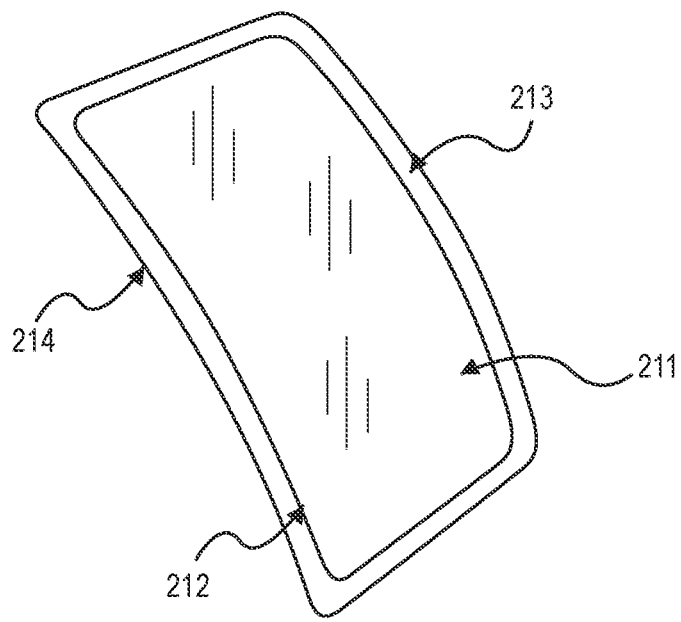
FIG. 2 schematically depicts a nanolaminated window in accordance with the present teachings.

FIG. 2 depicts a window assembly 210 in accordance with the present teachings. Although window assembly 210 is described with reference to an aircraft window, one of ordinary skill in the art will understand that the disclosed window assembly can be used for other purposes including, but not limited to, vehicles, equipment, and buildings and other structures. The one piece design of window assembly 210 includes a protection panel 211 and a structural panel 213. Structural panel 213 provides structural support and impact protection for window assembly 210. It further allows mounting without use of a frame. Protection panel 211 provides resistance to one or more of electromagnetic effect (EME), icing, scratching, and corrosion. Structural panel 213 is disposed on and attached to protection panel 211. Both protection panel 211 and structural panel 213 are formed of a plurality of nanolaminated layers. Structural panel 213 is larger than protection panel 211 so a structural panel edge 214 extends beyond a protection panel edge 212. As further discussed below, a portion of structural panel 213 that extends beyond protection panel edge 212 can be used to attach window assembly 210, for example, to an aircraft skin forming a fuselage without need for a frame. Protection panel 211 is sized to fill a cutout and sit flush, for example, with an outside of the aircraft fuselage. It provides a view through the aircraft fuselage, prevents air drag and provides surface protection from EME, ice, and corrosion. Structural panel 213 provides load bearing capability to window assembly 210 and a location to attach window assembly 210 to, for example, the aircraft skin forming the fuselage.

To function as a window, window assembly 210 is transparent having a transmissivity of about 45% to about 99% to visible light. It can optionally have a transmissivity of about 55% to about 98%, or about 65% to about 95% to visible light. A shape of window assembly 210 is generally a polygon or a polygon with rounded corners, where the rounded corners have a radius arc $r_c$ of about 0.25 inches or more. The shape of window assembly 210 can also range from a convex shape with a radius R of about 5 inches or more to an essentially flat shape with an infinite radius. This can allow window assembly 210 to mount flush with, for example, an aircraft fuselage having a curvature or equipment/structure having no curvature.

Figure 3:
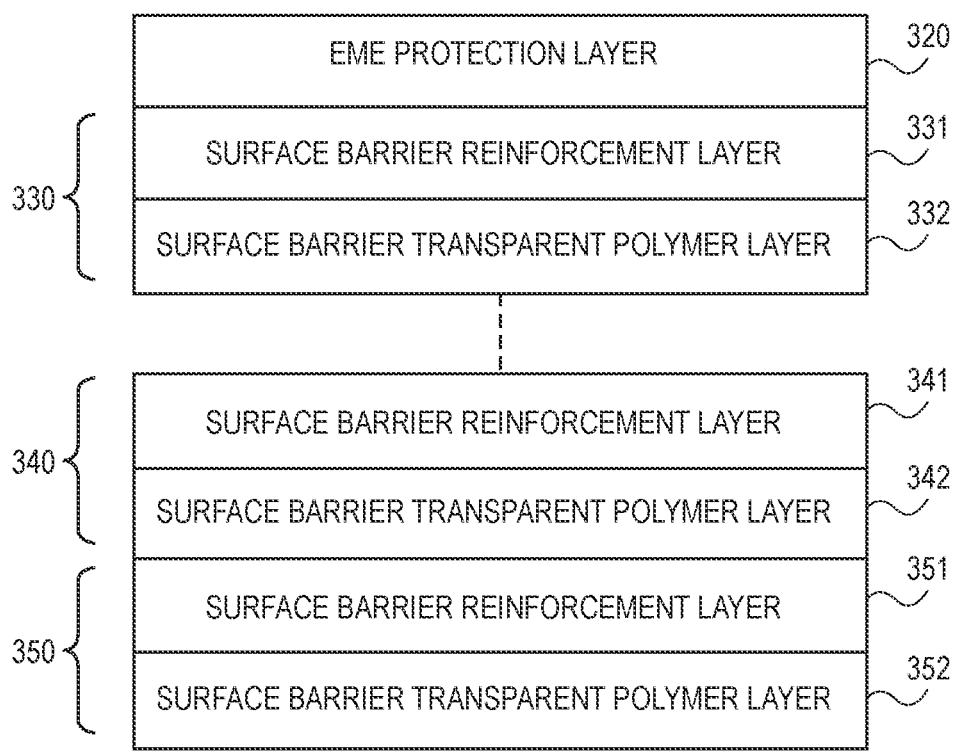
FIG. 3 schematically depicts a plurality of nanolaminated layers forming a protection panel in accordance with the present teachings.

As shown in FIG. 3, protection panel 211 can include a surface barrier layer 330 and an electromagnetic effect (EME) protection layer 320. EME protection layer 320 has a thickness of about 50 nm to about 20,000 nm and is formed of carbon nanotubes or indium tin oxide (ITO) with graphene. EME protection layer 320 is disposed on surface barrier layer 330.

Surface barrier layer 330 is formed of a plurality of nanolaminated layers including a surface barrier reinforcement layer 331. Surface barrier reinforcement layer 331 is formed of $Al_2O_3$ or graphene and has a thickness of about 500 nm to about 50,000 nm. Surface barrier reinforcement layer 331 serves as a moisture barrier for corrosion protection and provides protection from impact, scratching, and burn thorough. Surface barrier reinforcement layer 331 is disposed on a surface barrier transparent polymer layer 332. Surface barrier transparent polymer layer 332 has a thickness of about 20 nm to about 2,000 nm and is formed of a high temperature thermoplastic material having a glass transition temperature Tg of about 120° F. to about 750° F., including, but not limited to, polystyrene (PS), polyetherimide (PEI), and mixtures thereof.

Protection panel 211 can optionally include one or more additional surface barrier layers having similar thickness and composition to surface barrier layer 330, as shown in FIG. 3. The additional one or more surface barrier layers can serve as fail safe layers against corrosion, scratching, impact, and burn through. As depicted in FIG. 3, protection panel 211 can include two or more surface barrier layers, for example, surface barrier layer 340 and surface barrier layer 350. Surface barrier layer 340 can include a surface barrier reinforcement layer 341 formed of $Al_2O_3$ or graphene and having a thickness of about 500 nm to about 50,000 nm. Surface barrier reinforcement layer 341 can be disposed on surface barrier transparent polymer layer 342, have a thickness of about 20 nm to about 2,000 nm, and be formed of a high temperature thermoplastic material including, but not limited to, polystyrene (PS), polyetherimide (PEI), and mixtures thereof. Similarly, surface barrier layer 350 can include a surface barrier reinforcement layer 351 formed of $Al_2O_3$ or graphene, have a thickness of about 500 nm to about 50,000 nm. Surface barrier reinforcement layer 351 can be disposed on surface barrier transparent polymer layer 352, have a thickness of about 20 nm to about 2,000 nm, and be formed of a high temperature thermoplastic material including, but not limited to, polystyrene (PS) and polyetherimide (PEI). Protection panel 211 can further optionally include additional surface barrier reinforcement layers or surface barrier transparent polymer layers.

Protection panel 211 has a thickness of about 0.05 to about 0.8 inches and provides resistance to one or more of EME, icing, and corrosion. When window assembly 210 is used in an aircraft, protection panel 211 can be sized to provide an increased view outside of the aircraft and mounted flush to the outside of the fuselage to prevent air drag.

Figure 4:
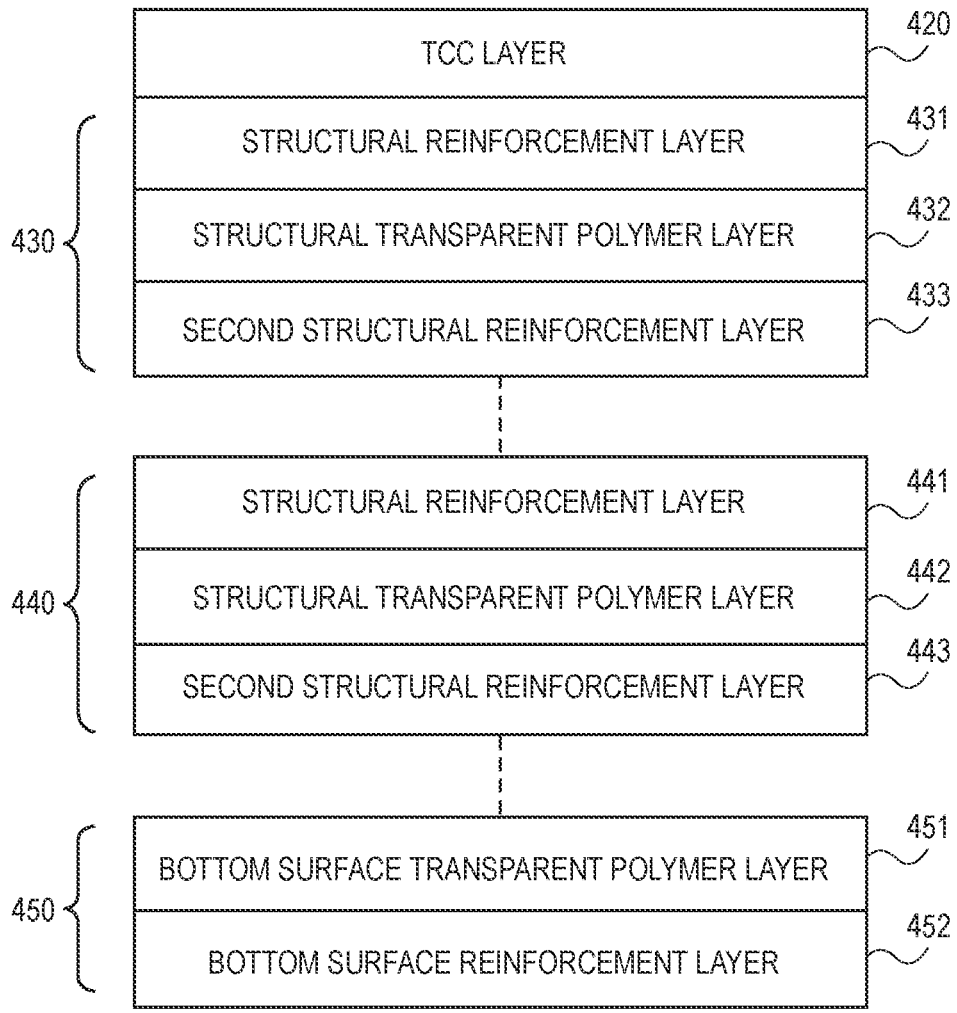
FIG. 4 schematically depicts a plurality of nanolaminated layers forming a structural panel in accordance with the present teachings.

As shown in FIG. 4, structural panel 213 can include a transparent conductive coating (TCC) layer 420, a structural layer 430, and a bottom surface protection layer 450. Structural panel 213 is formed of a plurality of nanolaminated layers and has a thickness of about 0.04 inches to about 0.6 inches.

TCC layer 420 has a thickness of about 50 nm to about 10,000 nm and can be formed of carbon nanotubes or ITO with graphene to provide EME protection. TCC layer 420 is disposed on structural layer 430.

Structural layer 430 is formed of a plurality of nanolaminated layers and includes one or more first structural reinforcement layers 431, where each first structural reinforcement layer has a thickness of about 20 nm to about 1,000 nm. The one or more first structural reinforcement layers 431 are disposed on a structural transparent polymer layer 432 having a thickness of about 20 nm to about 1,000 nm. Structural transparent polymer layer 432 is disposed on one or more second structural reinforcement layer 433, where each second structural reinforcement layer has a thickness of about 20 nm to about 1,000 nm. First structural reinforcement layer 431 and second structural reinforcement layer 433 can be formed of $Al_2O_3$, $SiO_2$, or graphene. Structural transparent polymer layer 432 can be formed of a high temperature thermoplastic material including, but not limited to, polystyrene (PS) and polyetherimide (PEI). The high temperature thermoplastic material can have a glass transition temperature of at least 120° F. or more.

Structural panel 213 can optionally include one or more additional structural layers. Structural panel 213, for example, can include two or more structural layers, such as structural layer 440 as shown in FIG. 4. Structural layer 440 can include: i) one or more first structural reinforcement layers 441 each having a thickness of about 20 nm to about 1,000 nm and formed of $Al_2O_3$ or graphene or $SiO_2$; ii) a structural transparent polymer layer 442, having a thickness of about 20 nm to about 1,000 nm and formed of a high temperature thermoplastic material including, but not limited to, polystyrene (PS) and polyetherimide (PEI); and, iii) one or more second structural reinforcement layers 443 each having a thickness of about 20 nm to about 1,000 nm and formed of $Al_2O_3$, $SiO_2$, or graphene.

Structural panel 213 further includes a bottom surface protection layer 450 formed of a plurality of nanolaminated layers. Bottom surface protection layer 450 includes a bottom surface transparent polymer layer 451 formed of a high temperature thermoplastic material including, but not limited to, polystyrene (PS) and polyetherimide (PEI), and having a thickness of about 20 nm to about 1,000 nm. Bottom surface transparent polymer layer 451 is disposed on bottom surface reinforcement layer 452. Bottom surface reinforcement layer 452 is formed of $Al_2O_3$ or graphene and can have a thickness of about 20 nm to about 1,000 nm.

When window assembly 210 is attached to a vehicle, equipment, or structure, structural panel 213 bears the load. Accordingly, structural panel 213 can include about 33% to about 90% volume fraction of $Al_2O_3$ and/or graphene or $SiO_2$ with at least about 5% to about 30% volume fraction of $Al_2O_3$. Structural panel 213 can have a tensile strength of about 30 ksi to about 2,000 ksi, a bearing strength of about 50 ksi or more, a modulus of about 3 msi to about 30 msi, and/or a glass transition temperature (Tg) of about 100° F. or more. Tensile strength of structural panel 213 can be measured, for example, using ASTM-D3039 and bearing strength can be measured, for example, using ASTM-D5961. To minimize material property mismatch, structural panel 213 can have a coefficient of thermal expansion of about 5 to about 20 ppm in/in/° F. Structural panel 213 can have a von Mises stress of about 10 ksi to about 200 ksi. The von Mises stress can be determined, for example, using Abaqus FEA software available from Dassault Systèmes (Johnstown, RI).

Figure 5:
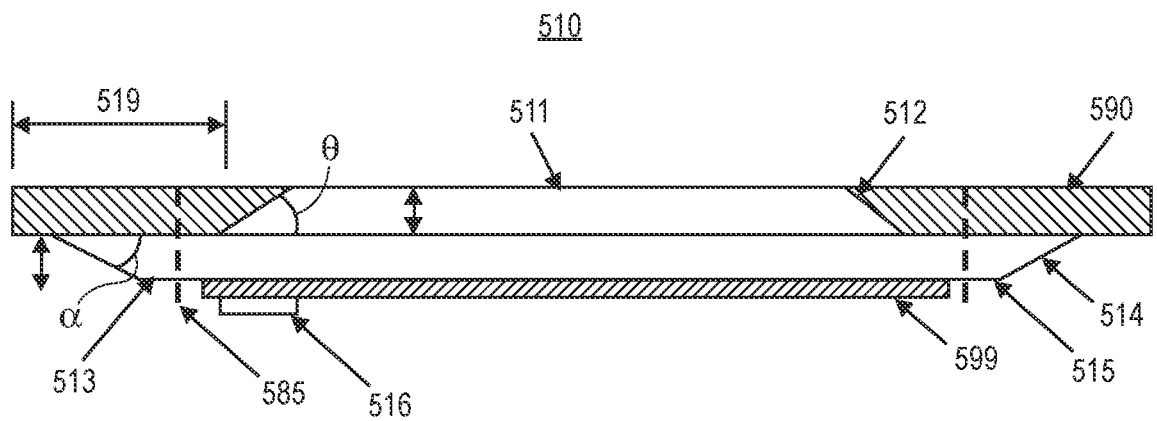
FIG. 5 schematically depicts a cross-sectional view of a nanolaminated window in accordance with the present teachings.

FIG. 5 depicts a cross sectional view of a window assembly 510 mounted in an aircraft in accordance with the teachings of the present disclosure. Window assembly 510 includes a protection panel 511 and a structural panel 513. Window assembly 510 is mounted to an aircraft skin 590, for example forming a fuselage, without use of a frame, for example, using one or more fasteners 585 and/or adhesive to attach structural panel 513 to aircraft skin 590. Structural panel can include a tapered edge 514 having an angle of about 12 to about 90 degrees. Tapered edge 514 minimizes local stress at and near edges of structural panel 513. Protection panel 511 can be sized to fit into a cutout in aircraft skin 590. Additionally, protection panel 511 can include a tapered edge 512 having an angle of about 30 to about 80 degrees. Tapered edge 512 allows window assembly 510 to attach and seal securely to aircraft skin 590. Because aircraft skin 590 has a curved surface, window assembly 510 can have a convex shape and a radius of curvature R to match aircraft skin 590. Both protection panel 511 and structural panel 513 have a polygon shape with multiple edges connected by a radius arc $r_c$ of at least 0.25 inches. To enable mounting to aircraft skin 590 without a frame, a distance 519 from edge 512 to edge 514 can be 0.375 inches or more.

Window assembly 510 can optionally include an electronic shade 599, for example, a smart sensor based electronic shade, to reduce the amount of light that reaches the interior of the aircraft through window assembly 510. Electronic shade 599 can be made of electrochromic glass layers deposited onto an inside 515 of window assembly 510 or self-sticking electrochromic films attached to inside 515 of window assembly 510. Electronic shade 599 can be controlled by smart light sensors 516 to reduce or increase an amount of sunlight entering through window assembly 510, for example, by turning from clear to dark blue or gray to reduce the amount of sunlight.

Figure 6:
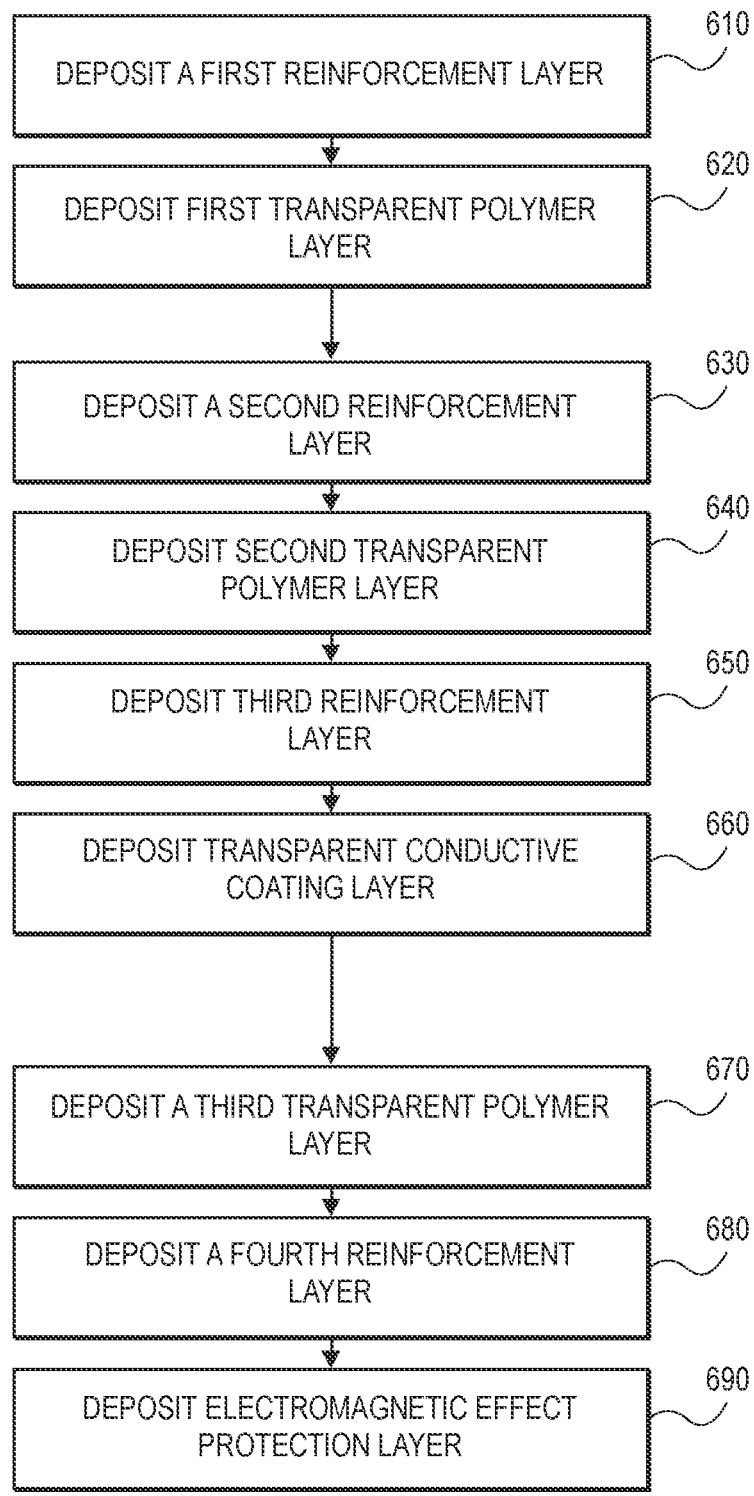
FIG. 6 is a flowchart depicting a method for making a nanolaminated window assembly in accordance with the present teachings.

A method 600 for forming window assembly 510 by depositing a plurality of nanolaminated layers is shown in FIG. 6. Each of the plurality of nanolaminated layers can be deposited using vacuum vapor depositional processes including, but not limited to, physical vapor deposition (PVD), chemical vapor deposition (CVD), pulsed laser deposition (PLD), and/or vacuum spraying.

A structural panel, for example, structural panel 213 shown in FIGS. 2 and 3 or structural panel 513 shown in FIG. 5, can be formed by deposing a plurality of nanolaminated layers to form a bottom surface protection layer, one or more structural layers, and a transparent conductive coating (TCC) layer.

At 610 of method 600, a bottom surface protection layer is formed by depositing a first reinforcement layer comprising one or more layers of $Al_2O_3$, one or more layers of graphene, or one or more layers of $Al_2O_3$ and graphene. At 620 of method 600, a first transparent polymer layer comprising a thermoplastic material is then deposited on the first reinforcement layer.

At 630 of method 600, one or more structural layers can be formed on the bottom surface protection layer by depositing a second reinforcement layer comprising one or more layers of $Al_2O_3$, one or more layers of graphene, one or more layers $SiO_2$, or a combination thereof, on the bottom surface protection layer. A second transparent polymer layer comprising a thermoplastic material can be deposited on the second reinforcement layer at 640 of method 600. A third reinforcement layer comprising one or more layers of $Al_2O_3$, one or more layers of graphene, or one or more layers of $Al_2O_3$ and graphene can be deposited on the second transparent polymer layer at 650 of method 600. Additional structural layers can be formed by repeating 630 to 650 of method 600 shown in FIG. 6.

At 660 of method 600, a transparent conductive coating layer comprising one or more of ITO and graphene on the third reinforcement layer is formed on the third reinforcement layer.

A protection panel, for example protection panel 211 as shown in FIGS. 2 and 3 or protection panel 511 shown in FIG. 5 can then formed on the structural panel.

At 670 of method 600, a surface barrier layer is formed by depositing a third transparent polymer layer comprising a thermoplastic material on the transparent conductive coating layer. At 680 of method 600, a fourth reinforcement layer comprising one or more layers of $Al_2O_3$, one or more layers of graphene, or one or more layers of $Al_2O_3$ and graphene is deposited on the third transparent polymer layer. Additional surface barrier layers can be formed by repeating 670 to 680 of method 600.

The protection panel is completed by depositing an electromagnetic effect coating on the fourth reinforcement layer as shown at 690 of method 600.

One of ordinary skill in the art will understand that fabrication of one piece multifunction window assembly 510 using method 600 can be accomplished by forming the structural panel after forming the protection panel. In other words, 670 to 690 of method 600 can be performed prior 630 to 660 of method 600 being performed. Furthermore, fabrication of the structural panel and/or protection panel can be in a piecemeal manner. In other words, a first group of several layers can be deposited and a second group of several layers can be separately deposited. The first group of layers can then be bonded to the second group of layers. For example, a first structural layer composed of a first group of layers can be formed by performing 630 to 650 of method 600 shown in FIG. 6. A second structural layer composed of a second group of layers can then be separately formed by performing 630 to 650 of method 600. The first structural layer and the second structural layer can then be bonded together to form a portion of a structural panel, for example, structural panel 513 shown in FIG. 5. Bonding can use, for example, glue that has a similar transparency and a similar or higher glass transition temperature Tg compared to the transparent thermoplastic material forming the structural panel and/or the protection panel.

Using method 600 to form one piece multifunction window assembly 510 allows the number of layers, the placement of the layers relative to each other, the composition of the layers, and the thickness of the layers to be controlled. This can result in improved properties, including isotropic stiffness and strength and reduced defects that can be tailored for specific use and environments. Additionally, method 600 can be used to form net-shape or near net shape window assemblies of desired dimensions, so no pre-trimming or post-trimming is needed.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. For example, steps of the methods have been described as first, second, third, etc. As used herein, these terms refer only to relative order with respect to each other, e.g., first occurs before second. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for producing a window assembly, the method comprising:
    producing a structural panel comprising:
        depositing one or more structural reinforcement layers, wherein each of the one or more structural reinforcement layers comprises a plurality of nanolaminated layers, and wherein the nanolaminated layers comprise $Al_2O_3$, $SiO_2$, graphene, or a combination thereof; and
        depositing a structural transparent polymer layer on the one or more structural reinforcement layers, wherein the structural transparent polymer layer comprises a transparent thermoplastic material,
    wherein an edge of the structural panel mounts the window assembly directly to a vehicle to provide load bearing capability without a window frame.

2. The method of claim 1, wherein the structural panel comprises:
    a tensile stress of about 30 ksi to about 2,000 ksi;
    a bearing strength of about 50 ksi or more;
    a modulus of about 3 msi to about 30 msi;
    a glass transition temperature (Tg) of about 100° F. or more; and
    a coefficient of thermal expansion of about 5 to about 20 ppm in/in/° F.

3. The method of claim 1, wherein the structural panel and has a thickness of about 0.04 to about 0.60 inches.

4. The method of claim 1, wherein the edge of the structural panel comprises a tapered edge having an angle that is less than 90 degrees.

5. The method of claim 1, further comprising:
producing a protection panel comprising:
depositing a surface barrier transparent polymer layer onto the structural panel, wherein the surface barrier transparent polymer layer comprises a transparent thermoplastic material; and
depositing a surface barrier reinforcement layer onto the surface barrier transparent polymer layer, wherein the surface barrier reinforcement layer comprises a plurality of nanolaminated layers, and wherein the nanolaminated layers comprise carbon nanotubes, indium tin oxide with graphene, or a combination thereof.

6. The method of claim 5, wherein an edge of the structural panel extends beyond an edge of the protection panel.

7. The method of claim 5, wherein producing the structural panel further comprises depositing a transparent conductive coating layer on the one or more structural reinforcement layers, and wherein the surface barrier transparent polymer layer is deposited onto the transparent conductive coating layer.

8. The method of claim 5, wherein the protection panel provides resistance to electromagnetic effect, icing, and corrosion.

9. The method of claim 5, wherein the protection panel is sized to fit in a cutout of an aircraft skin, and wherein a portion of the structural panel that extends beyond an edge of the protection panel comprises a distance of 0.375 inches or more and is configured to attach directly to the aircraft skin.

10. The method of claim 5, wherein the protection panel has a thickness of about 0.05 to about 0.80 inches.

11. The method of claim 5, wherein an edge of the protection panel comprises a tapered edge having an angle of 30 to 80 degrees.

12. The method of claim 5, further comprising depositing an electromagnetic effect coating on the protection panel.

13. A method for assembling a vehicle, the method comprising:
mounting a window assembly to the vehicle, wherein the window assembly comprises:
a protection panel comprising:
a surface barrier transparent polymer layer comprising a transparent thermoplastic material; and
a surface barrier reinforcement layer formed of a plurality of nanolaminated layers disposed on the surface barrier transparent polymer layer, wherein the nanolaminated layers comprise one of carbon nanotubes, indium tin oxide with graphene, or combinations thereof; and
a structural panel disposed on the protection panel, the structural panel comprising:
a structural transparent polymer layer comprising a transparent thermoplastic material; and
one or more structural reinforcement layers disposed on the structural transparent polymer layer, wherein each of the one or more structural reinforcement layers comprise a plurality of nanolaminated layers, the nanolaminated layers comprising $Al_2O_3$, $SiO_2$, graphene, or combinations thereof,
wherein the structural panel includes a structural panel edge that mounts the window assembly directly to the vehicle to provide load bearing capability without a window frame.

14. The method of claim 13, wherein the structural panel edge extends beyond a protection panel edge.

15. The method of claim 14, wherein the vehicle comprises an aircraft.

16. The method of claim 14, wherein the structural panel edge comprises a tapered edge having an angle that is less than 90 degrees.

17. The method of claim 14, wherein the protection panel edge comprises a tapered edge having an angle of 30 to 80 degrees.

18. The method of claim 13, wherein the structural panel has a tensile stress of about 30 ksi to about 2,000 ksi to bear a structural load when mounted directly to the vehicle without a window frame, and wherein the window assembly has a transmissivity of about 45% to about 99% to visible light.

19. A method for producing a window assembly, the method comprising:
producing a protection panel comprising a protection panel edge; and
coupling a structural panel to the protection panel, wherein the structural panel comprises a plurality of nanolaminated layers, and wherein each of the plurality of nanolaminated layers has a thickness in a range from 20 nm to 1,000 nm,
wherein the structural panel has a tensile stress of about 30 ksi to about 2,000 ksi,
wherein an edge of the structural panel mounts the window assembly directly to a vehicle to bear a structural load without a window frame, and
wherein the window assembly has a transmissivity of about 45% to about 99% to visible light.

* * * * *